US006313871B1

(12) United States Patent
Schubert

(10) Patent No.: US 6,313,871 B1
(45) Date of Patent: Nov. 6, 2001

(54) APPARATUS AND METHOD FOR MONITORING GAMBLING CHIPS

(75) Inventor: Oliver M. Schubert, Las Vegas, NV (US)

(73) Assignee: Casino Software & Services, Las Vegas, NV (US)

( * ) Notice: Subject to any disclaimer, the term of this patent is extended or adjusted under 35 U.S.C. 154(b) by 0 days.

(21) Appl. No.: 09/253,178

(22) Filed: Feb. 19, 1999

(51) Int. Cl.[7] ....................................... H04N 7/18
(52) U.S. Cl. ..................... 348/143; 348/151; 348/159
(58) Field of Search .................................. 348/143, 151, 348/152, 153, 154, 155, 159; H04N 7/18

(56) References Cited

U.S. PATENT DOCUMENTS

| 4,531,187 | * | 7/1985 | Uhland | 463/12 |
| 4,813,675 | * | 3/1989 | Greenwood | 273/309 |
| 5,757,876 | * | 5/1998 | Dam et al. | 377/14 |
| 5,781,647 | * | 7/1998 | Fishbine et al. | 382/100 |
| 5,831,527 | * | 11/1998 | Jones, II et al. | 340/573.1 |

* cited by examiner

*Primary Examiner*—Howard Britton
(74) *Attorney, Agent, or Firm*—Stout, Uxa, Buyan & Mullins. LLP

(57) ABSTRACT

A sensor is disposed in proximity to the gaming table. The sensor is adapted to sense an occurrence of an event on a surface of the gaming table and to output a change-of-state signal. The video camera or video cameras that are disposed in proximity to the gaming table are configured and positioned to be activated to collect the video information relating to activities on the gaming table, and circuitry is adapted to detect the change-of-state signal from the sensor. The circuitry further is adapted to activate the video camera or video cameras to automatically collect the video information upon the detection by the circuitry of the change-of-state signal from the sensor.

71 Claims, 6 Drawing Sheets

US 6,313,871 B1

APPARATUS AND METHOD FOR MONITORING GAMBLING CHIPS

NOTICE OF COPYRIGHTS AND TRADE DRESS

A portion of the disclosure of this patent document may contain material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to casino monitoring systems and, more particularly, to image capture devices for collecting information relating to activities on casino gaming tables.

2. Description of Related Art

Casinos typically use video cameras for asset protection and dispute resolution. Traditionally video cameras are mounted on or near the ceiling. Two types of video cameras commonly used are Pan-Tilt-Zoom video cameras (PTZs) and fixed video cameras. PTZs usually cover multiple gaming tables, due to their high cost. Fixed video cameras are usually installed near the ceiling over each table as backup to the PTZs.

Due to the steep angle of the fixed video cameras, the bets on gaming tables are covered poorly. If a casino installs the fixed video cameras at a flatter angle to the table, to get a better view of the bets, interference with people walking in front of the video camera can be high. In addition, the resolution of video cameras and monitors commonly used today is generally not high enough to accurately recognize all of the bets on a table, when the entire table is in view.

With the zooming capability of PTZs, it is possible to accurately recognize bets on a table, but only a small area can typically be covered, leaving other areas unprotected.

A need exists in the prior art for a system that can allow a casino to efficiently and accurately view and record the bets on a table to aid with asset protection and dispute resolution.

SUMMARY OF THE INVENTION

In accordance with one aspect of the present invention, an apparatus for collecting video information relating to gaming activities includes a gaming table having an upper surface, a lower surface and a perimeter surrounding the upper surface of the gaming table, the upper surface lies in a plane which is substantially parallel to a support surface upon which the gaming table rests. When a plurality of lines are defined along the perimeter of the gaming table, each of the plurality of lines being defined to extend normally to the upper surface and to intersect the perimeter at a different point along the perimeter, the plurality of lines defines a surrounding wall of a volume of space above the upper surface, wherein the volume of space extends upwardly and normally above the upper surface, and wherein the volume of space is defined within the surrounding wall. The apparatus for collecting video information includes at least one video camera. The at least one video camera is adapted to collect video information pertaining to gaming activities being conducted on the upper surface of the gaming table. The video camera is positioned so that the line-of-sight of the video camera forms an acute angle with the plane of the upper surface.

In accordance with another aspect of the present invention, a sensor is disposed in proximity to the gaming table. The sensor is adapted to sense an occurrence of an event on a surface of the gaming table and to output a change-of-state signal. The video camera or video cameras that are disposed in proximity to the gaming table are configured and positioned to be activated to collect the video information relating to activities on the gaming table, and circuitry is adapted to detect the change-of-state signal from the sensor. The circuitry further is adapted to activate the video camera or video cameras to automatically collect the video information upon the detection by the circuitry of the change-of-state signal from the sensor.

In accordance with yet another aspect of the present invention, a method of collecting video information relating to activities on a gaming table includes a step of providing at least one sensor in proximity to the gaming table, the sensor being adapted to sense the occurrence of an event on the surface of the gaming table and to output a change-of-state signal. After the sensor is provided, at least one video camera is provided in proximity to the gaming table, the at least one video camera being configured and positioned to be activated to collect the video information relating to activities on the gaming table. The sensor or sensors output a change-of-state signal in response to the sensor or sensors sensing the occurrence of an event on the surface of the gaming table. A microprocessor 50 detects the change-of-state signal from the at least one sensor. As presently embodied, the microprocessor 50 can comprise a conventional 386, 486, Pentium based system, or other processor type. The microprocessor 50 subsequently activates the at least one video camera to automatically collect the video information, upon the detection by the circuit of the change-of-state signal from the at least one sensor.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Figure 1:
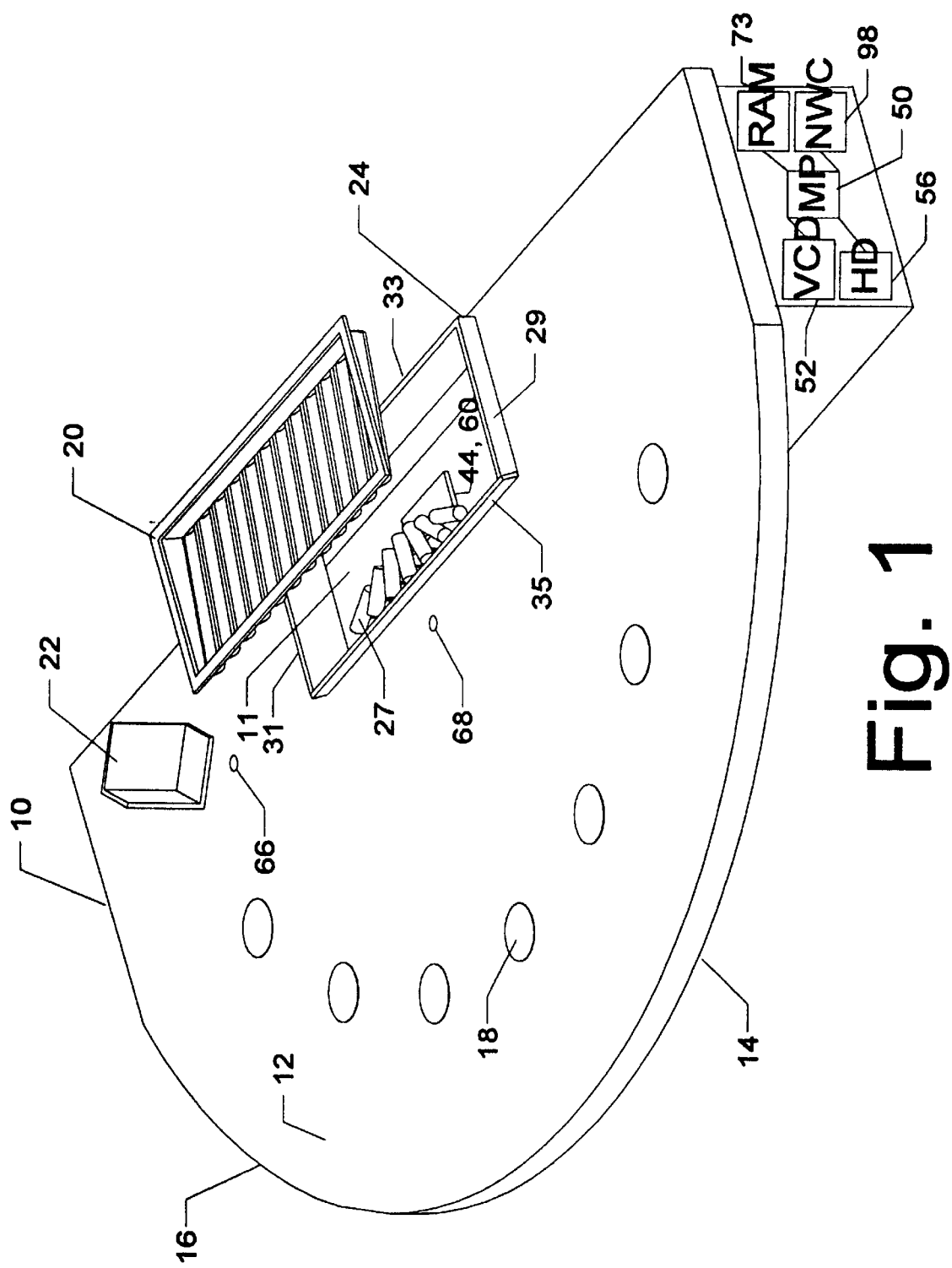
FIG. 1 is a schematic layout of a gaming table having the video monitoring system of the present invention installed thereon.
Figure 2:
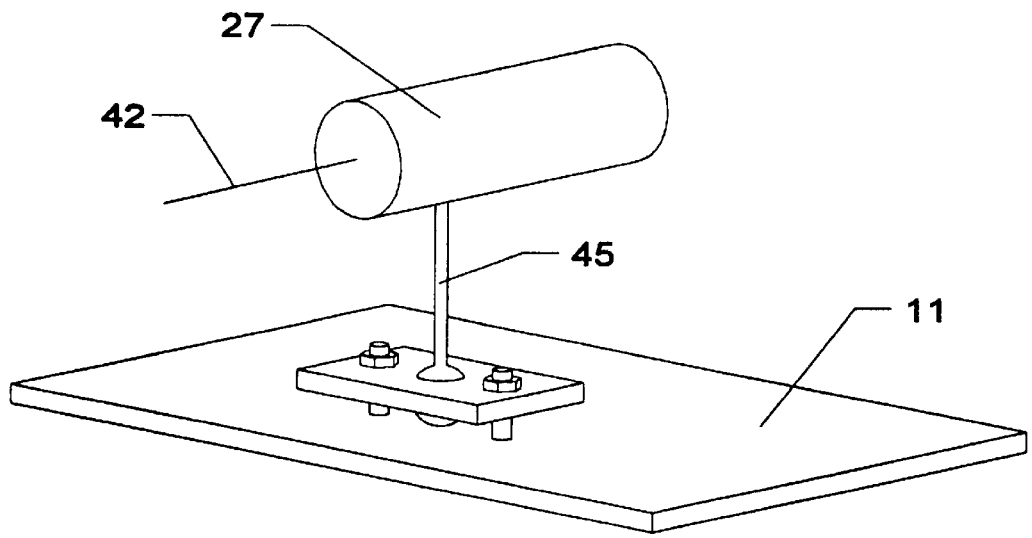
FIG. 2 is a perspective view illustrating a ball-and-socket assembly horizontally mounting a tubular-shaped video camera in accordance with the present invention.
Figure 3:
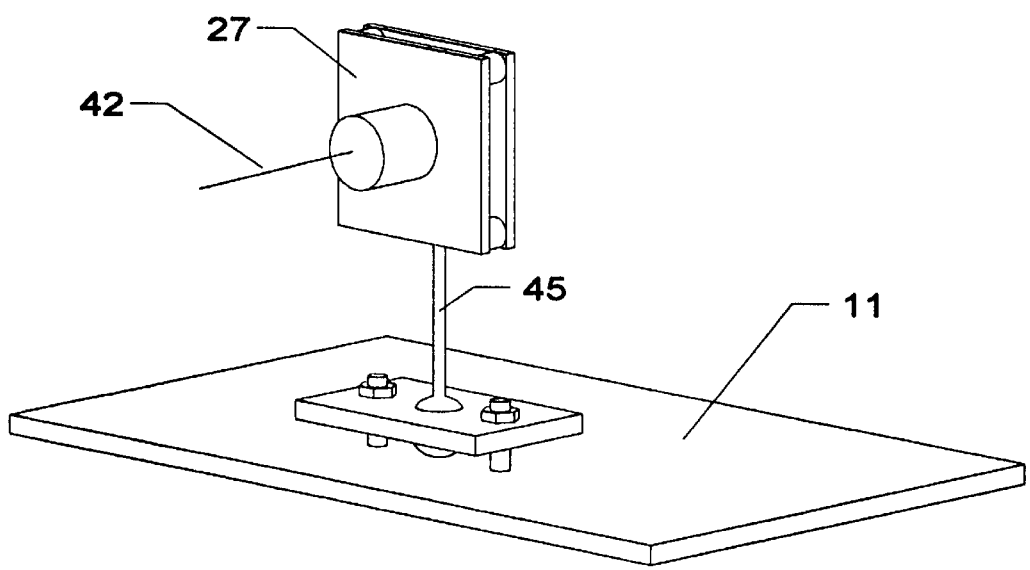
FIG. 3 is a perspective view illustrating a ball-and-socket assembly horizontally mounting a board-level video camera in accordance with the present invention.
Figure 4:
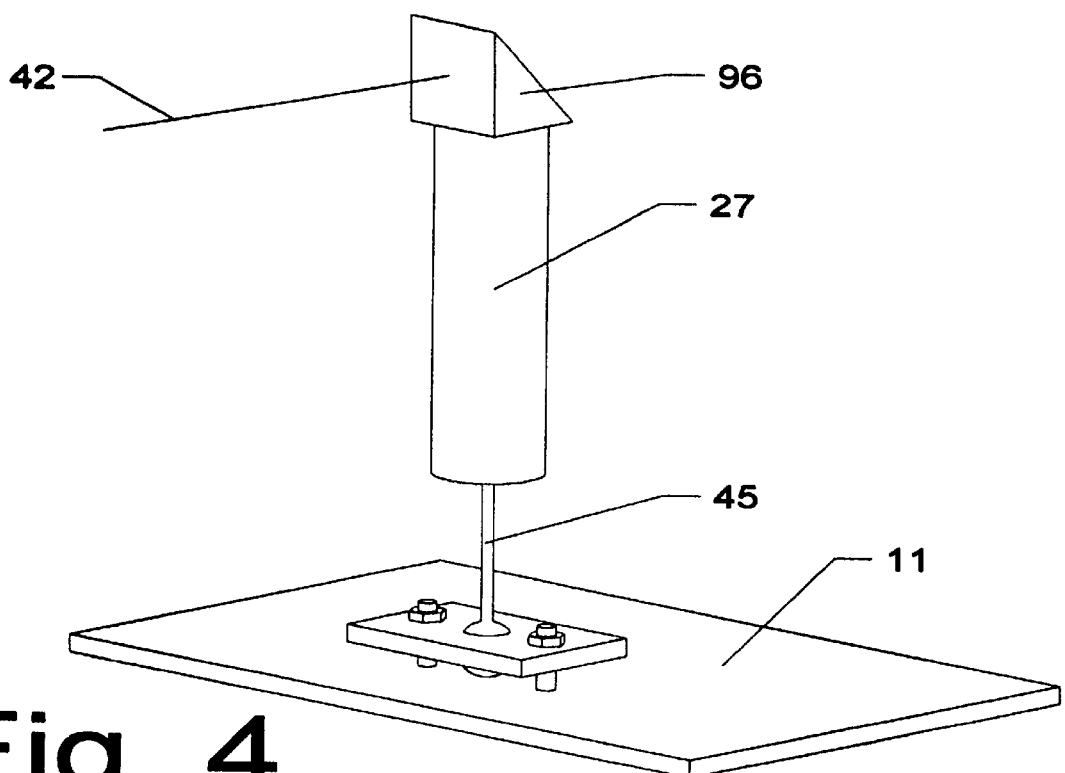
FIG. 4 is a perspective view illustrating a ball-and-socket assembly vertically mounting a tubular-shaped video camera and 90° prism in accordance with the present invention.
Figure 5:
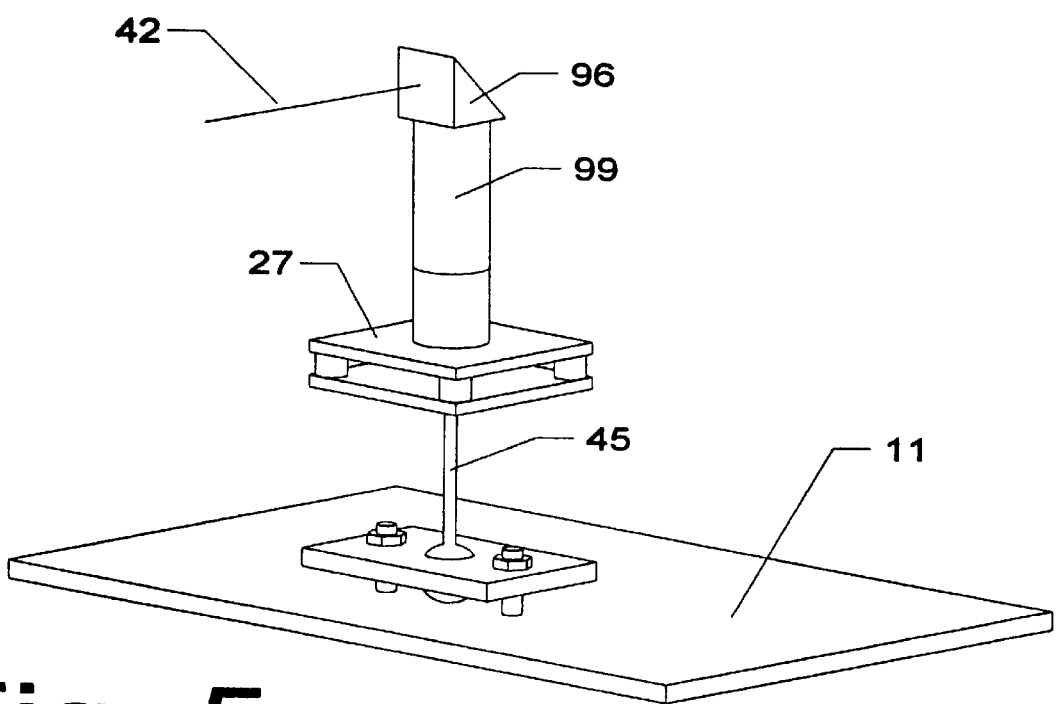
FIG. 5 is a perspective view illustrating a ball-and-socket assembly vertically mounting a board-level video camera and 90° prism in accordance with the present invention.

Referring now to FIG. 1 there is shown a gaming table 10 having an upper surface 12, a lower surface 14, and a perimeter 16 surrounding the upper surface 12 of the gaming table. Bet positions 18 are disposed in a semi-circle around a chip tray 20. Although the illustrated embodiment discloses a gaming table for card games and having seven bet positions, modified embodiments of the present invention are applicable to any gaming table or other surface where an activity is to be monitored and/or recorded using video cameras. A card discard rack 22 is positioned in the illustrated embodiment to the right of the chip tray 20.

In accordance with the presently preferred embodiment, the chip tray 20 is raised above the upper surface 12 of the gaming table 10 with a frame 24. The frame 24 is sized and constructed to accommodate the chip tray 20 thereupon and to provide a chamber therein for placement of one or more video cameras 27. In modified embodiments one or more of the plurality of cameras can be disposed at other locations on the gaming table 10. For example, the plurality of video cameras 27 can be disposed in a separate housing in front of the chip tray 20, in which case the chip tray 20 need not be elevated above the upper surface 12 of the gaming table. In the illustrated embodiment, each of the video cameras 27 comprises a miniature video camera such as Part #V-1212 or V-1210, manufactured by Marshall Electronics, or Part #MTV-271, manufactured by Mintron Enterprise.

In the illustrated embodiment, the frame comprises a left wall 29, a right wall 31, a back wall 33, and a transparent wall 35 extending between the left wall 29 and the right wall 31. The chip tray 20 is shown raised above the frame in FIG. 1 for illustrative purposes. In the illustrated embodiment, the frame 24 elevates the chip tray 20 about 2 cm above the upper surface 12 to accommodate seven video cameras 27. The frame 24 can be mounted on the upper surface of the gaming table 10 or can be mounted inside of a pre-existing hole cut into the gaming table 10 for accommodating the chip tray 20. The number and orientation of the video cameras 27 preferably correspond to the number and nature of sites to be monitored. In the illustrated embodiment, the seven video cameras are disposed in a row with each video camera focused on a corresponding bet position 18.

Figure 8:
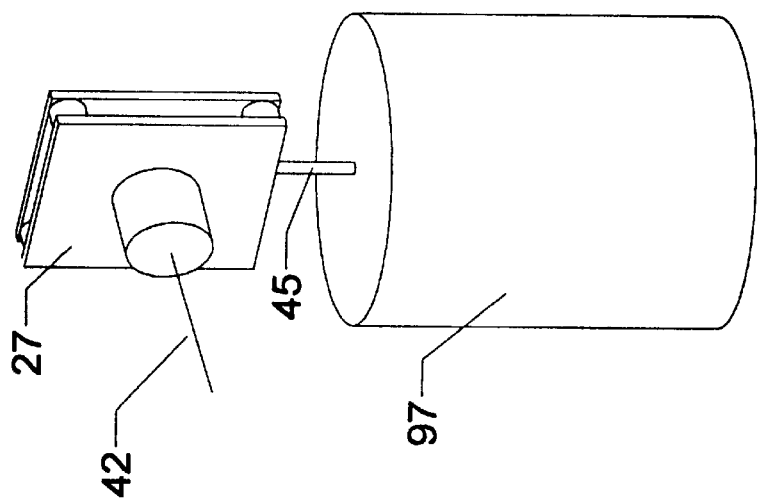
FIG. 8 is a perspective view illustrating a stepper-motor assembly horizontally mounting a board-level video camera in accordance with the present invention.
Figure 7:
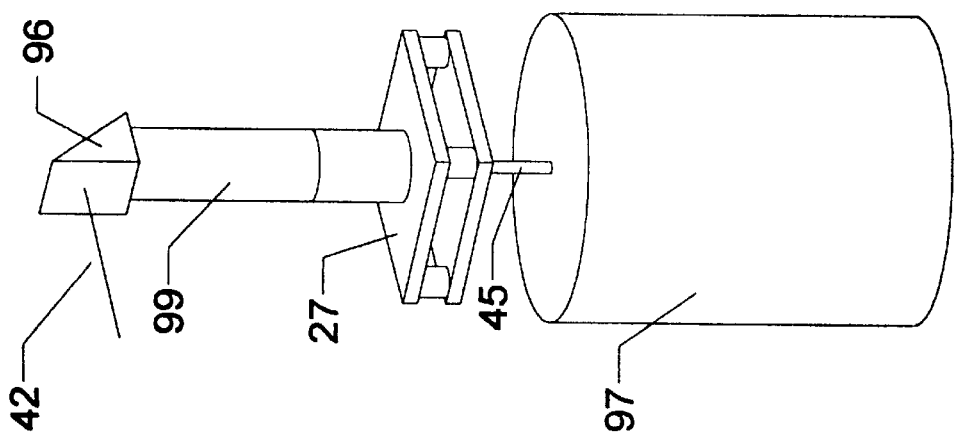
FIG. 7 is a perspective view illustrating a stepper-motor assembly vertically mounting a board-level video camera and 90° prism in accordance with the present invention.
Figure 6:
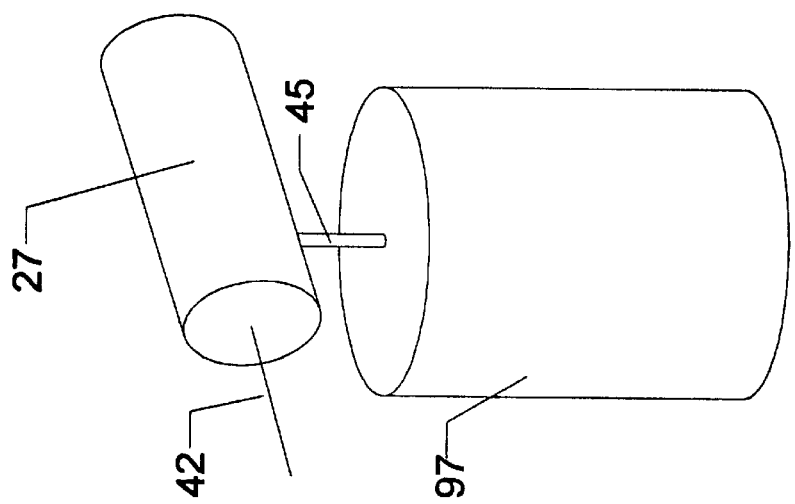
FIG. 6 is a perspective view illustrating a stepper-motor assembly horizontally mounting a tubular-shaped video camera in accordance with the present invention.

As shown in FIGS. 2–5, a ball-and-socket mount is preferably used to mount each video camera 27 to provide for a full range of angular movement for adjusting each video camera to be focused precisely on a corresponding bet position 18. As shown in FIGS. 6–8 a single camera mounted on a stepper-motor can be used as an alternative mounting method. As shown if FIGS. 4, 5 and 7, the camera can be mounted vertically, with a 90° prism or mirror on or above the camera lens. These mounting methods allow the camera(s) to be placed underneath the table, where there is more room. As shown in FIGS. 3, 5, 7 and 8, each tubular shaped camera can be replaced with a standard board-level camera and mounted either with a ball-and-socket type mount, or directly on a stepper-motor. Although the present invention contemplates virtually any type of device for collecting video information, simple, inexpensive cylindrically-shaped or standard board-level video cameras 27 can be used that do not have high quality components because of the close proximity of the video cameras to the targets being monitored.

Each video camera 27 is moved using the ball-and-socket 40 until the line-of-sight or axis 42 of the video camera 27 intersects the target to be monitored. The necks 45 of the mounts shown in FIGS. 2, 3, 4, 6 and 8 elevate the video cameras only slightly above the upper surface 12 of the gaming table 10. The connecting tubes 99, between the camera lenses and the 90° prisms or mirrors of the mounts shown in FIGS. 5 and 7, elevate the video cameras' lines-of-sight only slightly above the surface 12 of the gaming table 10. The relatively low elevation of each video camera's line-of-sight 27 and the close proximity of each video camera 27 to the bet positions 18 or other targets provides for accurate monitoring of the number and type of chips at the bet positions 18, for example.

Although the video cameras are placed beneath the chip tray 20 in the presently preferred embodiment, a modified embodiment of the present invention may have one or more video cameras positioned in different areas such as, for example, on, above, in front of or within the card discard rack 22. Additionally, video cameras can be installed within a raised rail or ridge that may be disposed around the perimeter 16, for example. In still other modified embodiments, video cameras can be suspended or mounted from the ceiling or walls. In yet another modified embodiment, video cameras may be used that can be mechanically or otherwise scanned from target to target. In accordance with a presently preferred embodiment, however, the video cameras are disposed slightly above the surface of the gaming table 10. In order to ensure that the video cameras are not too high above the gaming table 10, in accordance with this one preferred embodiment, the line-of-sight of each video camera is set to form an angle with a line parallel to the upper surface 12 that is less than about 45 degrees and, more preferably, less than about 10 degrees and, even more preferably, less than about 5 degrees. Other mounts and mounting orientations may be used in accordance with modified embodiments of the present invention, so long as at a minimum the end result allows the video camera(s) to collect video information of a target site of interest on the gaming table. One feature of the presently preferred embodiment is that the camera placements are esthetically pleasing and neither hinder the dealer nor bother the customer.

The transparent wall 35 in the front between table surface and chip tray 20 preferably comprises a tinted glass pane, which is tilted about 15° forward to eliminate the possibility of a player seeing the underside of a card in the reflection of the glass pane. The transparent wall 35 keeps smoke, spilled liquids and other image-compromising materials away from the video camera lenses, and is easy to clean.

Although the illustrated embodiment discloses a transparent wall 35 comprising a glass plane oriented at an angle to eliminate the possibility of players seeing the underside of a card in the reflection of the glass pane, other transparent walls, such as curved transparent walls (barriers) made of glass, plastic or one or more other materials, may be implemented at perpendicular or other orientations in modified embodiments. Such modified transparent walls 35 can be normal to the surface of the gaming table 10, for example, or disposed at other orientations to maximize the optics of one or more of the video cameras 27, but curved to eliminate the possibility of other players seeing reflections in the transparent wall 35. It is noted that, since in the illustrated embodiment the video cameras 27 focus on different bet positions 18 around the gaming table 10, a curved transparent wall may be used to optimize the optics between the video cameras 27 and the bet positions 18. The flat or planar transparent walls 35 of the presently preferred embodiment, however, may be more aesthetically appealing and more cost effective to manufacture, install and/or maintain.

In the illustrated embodiment, each of the video cameras 27 is connected to a video multiplexer 44, which is preferably installed behind the video cameras 27 directly underneath the chip tray 20. The video multiplexer allows random access to video cameras 27 and presently comprises an 8 channel—50 MHZ—video multiplexer amplifier—20 DIP Package, such as the integrated circuit MAX455CPP manufactured by Maxim Integrated Products. In accordance with the present invention, the close proximity between video cameras 27 and the video multiplexer 44 assures the best possible video quality.

The video multiplexer 44 is also connected to a microprocessor 50 and a video capture device 52. Instead of using a video multiplexer, a multi-channel video capture card, or multiple video capture cards could be used. The video capture device 52 converts analog video signals from the video cameras 27 to digital representations and, as presently embodied, stores the digital representations into internal memory. The video capture device 52 can comprise a conventional device, such as the Video Port Professional, Part #MS802, manufactured by MRT micro.

A sensor interface 60 is located on the same printed circuit board as the video multiplexer 44 in the illustrated embodiment to minimize the number of components. The sensor interface 60 provides the connection between the hand and card sensors 66, 68 and the microprocessor 50. As presently embodied, the sensor interface 60 is integrated into the video multiplexer 44 to reduce separate components and provide a central location for connection to the microprocessor 50.

The sensor interface 60 is connected to a hand sensor 66, a card sensor 68 and the microprocessor 50. The hand sensor 66 is preferably installed to the right of the chip tray 20 in front of the card discard rack 22. The hand sensor 66 detects the presence or absence of the dealer's hand when placed over the sensor and can comprise, for example, a CDs Photocell that reacts to changes in light intensity, such as Part #P1082-03 manufactured by Hamamatsu. The dealer may be a house dealer or a customer. In modified embodiments, other types of proximity sensors can be used, such as a stud sensor that reacts to changes in density of the surrounding area, Part #50782, manufactured by Zircon.

At the end of each round, the dealer naturally moves his or her hand to that location, as he or she puts the used cards into the card discard rack 22. To eliminate false triggers, when the dealer puts cards into the card discard rack 22 while a round is still in progress, the microprocessor 50 only reacts to the hand sensor 66, if no card has been detected by the card sensor 68.

In a modified embodiment of the present invention, the hand sensor 66 may be positioned on the left-hand side of the dealer. During the game the dealer pulls cards out of a card shoe located to his or her left and passes his or her hand over that location. To eliminate false triggers, the microprocessor 50 only reacts to the hand sensor 66, at the first change-of-state of the hand sensor 66 after no card has been detected by the card sensor 68.

The card sensor 68 is preferably disposed directly in front of the chip tray 20. While dealing the first set of cards, the dealer places his or her first card onto this card sensor 68. The card sensor 68 can comprise, for example, a CDs Photocell for reacting to changes in light intensity, such as Part #P1082-03, manufactured by Hamamatsu.

In a modified embodiment of the present invention either or both of the hand sensor 66 and the card sensor 68 may comprise video cameras. Video cameras used as sensors may be similar to the video cameras 27 or may be manufactured having optimal characteristics for detecting motion or the presence of an object, as distinguished from characteristics for generating relatively high or moderate resolution images. These video cameras used to detect certain occurrences on the gaming table 10 can be installed on or off the gaming table 10.

In yet another embodiment of the present invention either or both of the hand sensor 66 and the card sensor 68 can comprise one or more of the following types of sensors: an air pressure sensor reacting to the placement or removal of the card or the dealer's hand on the gaming table 10; an infrared sensor reacting to the absence or presence of body heat radiating from the dealer's hand; radar reacting to the approaching hand or card; and an ultrasound transmitter and receiver reacting to the change of echo when the dealer's hand or a card is placed over the sensor. Other types of sensors which either or both of the hand sensor 66 and the card sensor 68 may comprise, include: a magnetic hall-effect sensor reacting to the absence or presence of a small magnet located on the dealer's arm cuff; an inductive touch sensor reacting to the touch of the dealer's hand; and a photo transmitter and receiver reacting to the change in light intensity. Each sensor or sensors can be connected to or detached from (such as being positioned on a ceiling above) the gaming table 10. Although specific sensor types are listed, it is to be understood that other types of sensors can be used for the purposes described herein, without departing from the invention.

The passing of the dealer's hand over the hand sensor 66, in combination with no cards being detected by the card sensor 68, generally signals to the microprocessor 50, that a round has started. At this time, the microprocessor 50 transfers the images in RAM 73 to the hard drive 56. The hard drive 56 may comprise, for example, a two-Gigabyte capacity. A typical application of the present invention comprises a RAM 73 having a two-Megabyte capacity. To eliminate false triggers, the microprocessor 50 does not react to the card sensor 68 until the hand sensor 66 has been triggered and all images for the bet positions 18 have been stored in RAM 73. The present invention is able to avoid having to record several redundant pictures of the same position, because of this precise triggering.

Figure 9:
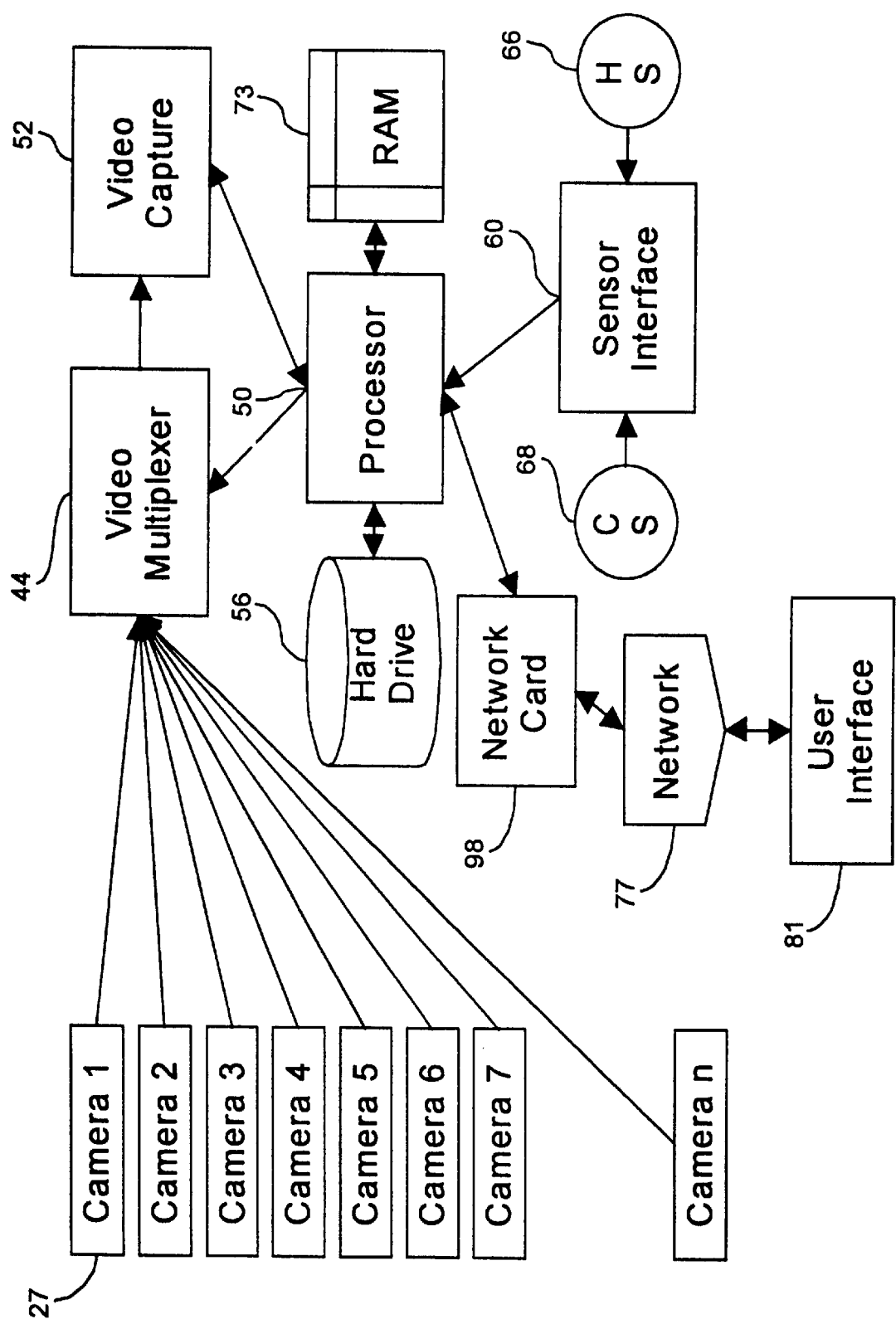
FIG. 9 is a block diagram illustrating key components of the video monitoring system of the present invention.

As illustrated in FIG. 1, the microprocessor 50, RAM 73, hard drive 56 and video capture device 52 are all electronically interconnected, and are all preferably installed on the lower surface 14 of the gaming table 10. The block diagram shown in FIG. 9 illustrates the interconnectivity of the various basic components of the present invention. The microprocessor 50 is connected to the hand sensor 66 and the card sensor 68 via the sensor interface 60, and is further connected to the video multiplexer 44 and a network 77 via the network card 98. A user at a remote station 81 on the network 77 can monitor activities on the gaming table 10 via the video data collected by the video cameras 27.

While bets are being made, the dealer has his or her right hand over the hand sensor 66, which is located to the right of the chip tray 20 near the card discard rack 22. In conjunction with the card sensor 68, which is located in front of the chip tray 20, not detecting a card, the microprocessor 50 sends signals to the video multiplexer 44 to switch from one video camera to the next. As each video camera 27 is selected, a picture is taken of each bet position 18 by the video capture device 52 and transferred to RAM 73. After the video multiplexer reaches the last video camera 27, the process starts anew. Only the last image for each position is kept in RAM 73.

Figure 10:
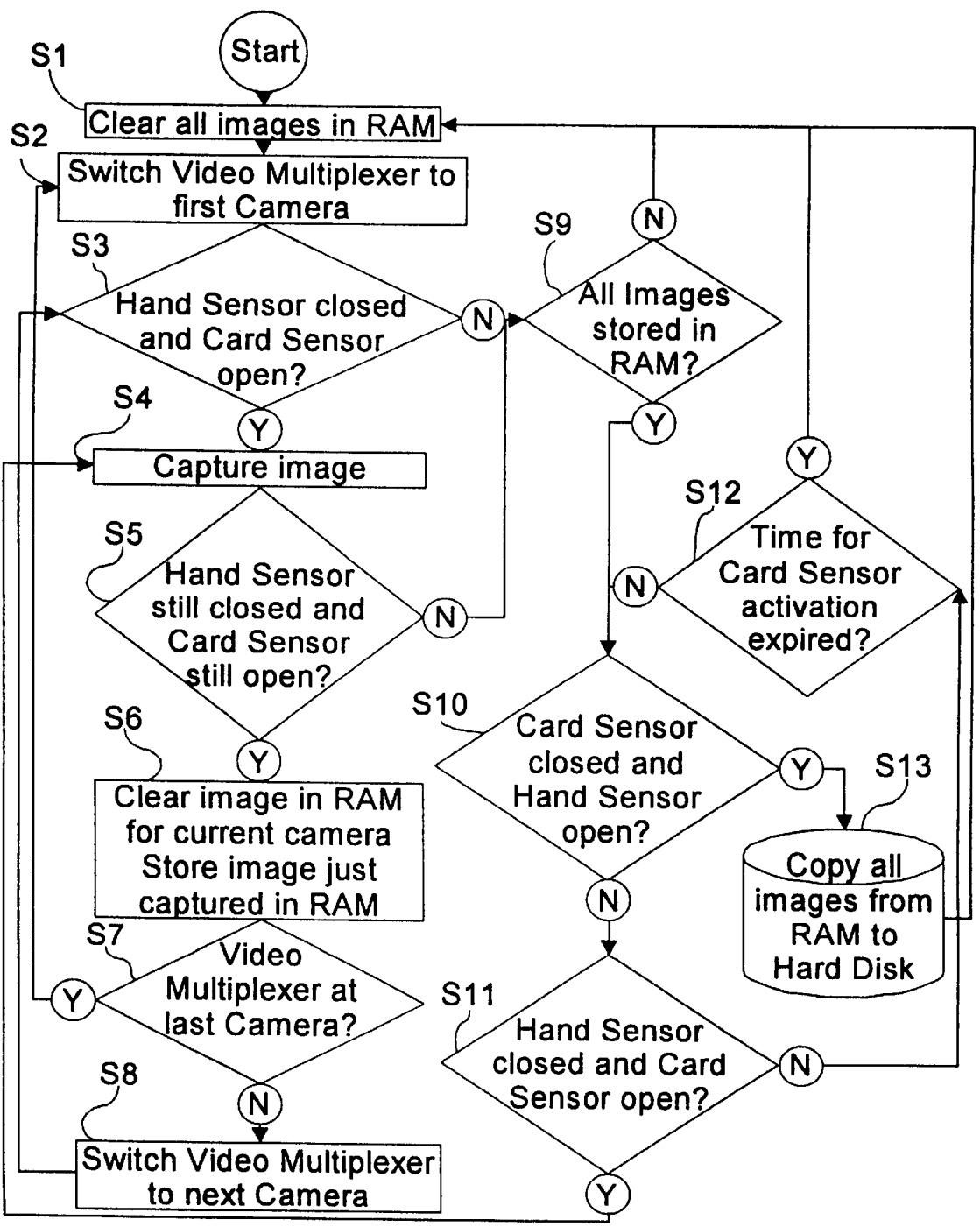
FIG. 10 is a block diagram illustrating a method of the present invention.

As soon as the dealer removes his or her right hand from the hand sensor 66, the microprocessor 50 stops to send the signals to the video multiplexer 44. If the dealer places his or her hand again on the hand sensor 66, the capture process starts again. When the dealer starts to deal, he or she has to remove his or her hand from the hand sensor 66. While dealing the first set of cards, he or she puts his or her first card on the card sensor 68 and then the microprocessor 50 copies the images from RAM 73 to the hard drive 56. FIG. 10 is a flow chart illustrating the method of the present invention.

An operator at a remote station 81 (FIG. 9) accesses the video image data via the network 77. As presently embodied, the remote station 81 is connected to all of the microprocessors 50 on the gaming tables of a casino through a standard computer network 77. The user at the remote station 81 can select a specific gaming table 10, one or more positions 18 is on that gaming table 10, and a specific time period, and all images are displayed matching the criteria specified. The user at the remote station 81 can select a specific gaming table 10, and an overall view of the gaming table 10 from an existing prior-art video camera can be displayed in real time together with the detailed images for all of the bet positions 18 from the video cameras 27. The user at remote station 81 can also select a specific gaming table 10, a start time, and an overall view of the gaming table 10, all of which was recorded earlier to video tape, and can have the earlier-recorded information displayed together with earlier-stored images from all of the bet positions 18 from the video cameras 27 after the specified start time.

FIG. 10 illustrates a method of a presently preferred embodiment. In step S1, all images in RAM 73 are erased to make room for new images. In step S2, the video multiplexer 44 is switched to the first video camera 27. In decision step S3, the states of the hand sensor 66 and card sensor 68 are checked. If the hand sensor 66 detects a hand and the card sensor 68 does not detect a card, step S4 is executed. If the hand sensor 66 does not detect a hand or the card sensor 68 does detect a card, decision step S9 is executed. In step S4, the image is captured by the video capture device 52 and stored in the internal memory of the video capture device 52.

In decision step S5, the states of the hand sensor 66 and card sensor 68 are checked again, to verify, that the states of these two sensors have not changed during the capturing of the image. If the states of these two sensors have not changed during the capture process, step S6 is executed. If the states of these two sensors have changed, decision step S9 is executed.

In step S6, the image captured earlier for the current camera 27 is erased to make room for the newly captured image. The newly captured image is transferred from the video capture device 52 to RAM 73.

In decision step S7, it is determined if the video multiplexer 44 has reached the last camera 27. If the last camera 27 has been reached, step S2 is executed. If the last camera 27 has not been reached, step S8 is executed.

In step S8, the video multiplexer 44 switches to the next camera 27. In decisions step S9, it is determined if all images for all cameras 27 have been stored in the RAM 73. If not all images have been stored in the RAM 73, the dealer had removed his or her hand too early from the hand sensor 66 and step S1 is executed. If all images have been stored in RAM 73, the dealer had his or her hand long enough on the hand sensor 66 for all images to be captured and stored, and decision step S10 is executed.

In decision step S10, the states of the card sensor 68 and hand sensor 66 are checked. If the card sensor 68 detects a card and the hand sensor 66 does not detect a hand, step S13 is executed. If the card sensor 68 does not detect a card or the hand sensor 66 does detect a hand, decision step S11 is executed.

In decision step S11, the states of the hand sensor 66 and card sensor 68 are checked. If the hand sensor 66 detects a hand and the card sensor 68 does not detect a card, the dealer has placed his or her hand again on the card sensor 68 before the round started, and step S4 is executed. If the hand sensor 66 does not detect a hand or the card sensor 68 does detect a card, decision step S12 is executed.

In decision step S12, the time-out for the card sensor 68 is checked. The stored images in RAM 73 lose significance, if too much time passes from the time the dealer removes his or her hand from the hand sensor 66 until he or she covers the card sensor 68 with his or her first card. If the time-out for the card sensor 68 activation has expired, step S1 is executed to erase the captured images. If the time-out for the card sensor 68 activation has not expired, decision step S10 is executed. In step S13, all images stored in RAM 73 are copied to the hard drive 71 for permanent storage.

While the gaming table 10 is empty, steps S1-S2-S3-S9 are performed in a loop. While the dealer has his or her hand on the hand sensor 66 and players are making their bets, steps S3-S4-S5-S6-S7-S8 are performed repeatedly. When the last camera 27 has been reached, steps S3-S4-S5-S6-S7-S2 are performed.

Once all images are stored and the dealer removes his or her hand from the hand sensor 66, steps S10-S11-S12 are performed repeatedly. Once the first card is placed on the card sensor 68, steps S13-S1-S2 are performed. If the dealer places his or her hand on the hand sensor 66 again after all images are stored, steps S11-S4 are executed. If the dealer removes his or her hand from the hand sensor 66 before all images are stored, steps S3-S9-S1-S2 are performed repeatedly until the dealer places his or her hand again on the hand sensor 66. If the dealer removes his or her hand from the hand sensor 66 while an image is being captured, steps S5-S9 are performed.

In a typical full sequence event the following levels of operation are executed in this sequence:

(1) While the gaming table 10 is empty, steps S1-S2-S3-S9 are performed.

(2) While the players make their bets, steps S3-S4-S5-S6-S7-S8 or steps S3-S4-S5-S6-S7-S2 (when the video multiplexer 44 has reached the last camera 27) are performed.

(3) When all players have made their bets and the dealer removes his or her hand from the hand sensor 66, steps S3-S9 or steps S5-S9 are performed. Steps S10-S11-S12 are repeated until the first card is placed on the card sensor 68.

(4) When the first card is placed on the card sensor 68, steps S10-S13-S1-S2-S3 are performed.

(5) Start over from the (2) level of operation.

As required, detailed embodiments of the present invention are disclosed herein. However, it is to be understood that the disclosed embodiments are merely exemplary of the invention, which may be embodied in various forms. Therefore, specific structural and functional details disclosed herein are not to be interpreted as limiting but rather as the basis for the claims and as a representative basis for teaching one skilled in the art to employ the present invention in virtually any appropriately detailed system. Many other changes, modifications and substitutions, in addition to those set forth in the above paragraphs, may be made by one having ordinary skill in the art without necessarily departing from the spirit and scope of the present invention.

What is claimed is:

1. An apparatus for collecting video information relating to gaming activities, the apparatus comprising:

a gaming table having an upper surface, a lower surface and a perimeter surrounding the upper surface of the gaming table, the upper surface lying in a plane which is substantially parallel to a support surface upon which the gaming table rests, wherein a plurality of lines can be defined along the perimeter of the gaming table, each of the plurality of lines being defined to extend normally to the upper surface and to intersect the perimeter at a different point along the perimeter, the plurality of lines defining a surrounding wall of a volume of space above the upper surface, wherein the volume of space extends upwardly and normally above the upper surface, and wherein the volume of space is defined within the surrounding wall; and at least one video camera disposed in the volume of space above the upper surface or below the lower surface, the at least one video camera being adapted to collect video information pertaining to gaming activities being conducted on the upper surface of the gaming table;

wherein the at least one video camera comprises a line-of-sight, which comprises an axis of the video camera defined between a focal point on a lens of the video camera and a focal point on a target at which the video camera is aimed, the video camera being positioned of the gaming table so that the line-of-sight of the video camera forms an angle with the plane of the upper surface that is less than about 45 degrees.

2. The apparatus for collecting video information relating to gaming activities as set forth in claim 1, wherein the at least one video camera is physically connected to the gaming table.

3. The apparatus for collecting video information relating to gaming activities as set forth in claim 1, wherein the at least one video camera is positioned to have a line of sight of less than about 10 degrees with the plane of the upper surface.

4. The apparatus for collecting video information relating to gaming activities as set forth in claim 1, wherein the at least one video camera is positioned on the gaming table to have a line of sight of less than about 5 degrees with the plane of the upper surface.

5. The apparatus for collecting video information relating to gaming activities as set forth in claim 4, wherein the at least one video camera is positioned beneath a chip tray on the gaming table.

6. The apparatus for collecting video information relating to gaming activities as set forth in claim 5, wherein the at least one video camera positioned beneath the chip tray on the gaming table comprises a plurality of video cameras positioned beneath the chip tray on the gaming table.

7. The apparatus for collecting video information relating to gaming activities as set forth in claim 6, wherein:

the gaming table comprises a plurality of bet positions disposed on the upper surface of the gaming table; and each of the plurality of video cameras positioned beneath the chip tray on the gaming table is focused on a different one of the bet positions.

8. The apparatus for collecting video information relating to gaming activities as set forth in claim 7, and further comprising a multiplexer operatively connected to each of the plurality of video cameras, the multiplexer being responsive to inputs from a remote station to switch between each of the plurality of video cameras.

9. The apparatus for collecting video information relating to gaming activities as set forth in claim 8, wherein the multiplexer is disposed behind the video cameras directly underneath the trip tray.

10. The apparatus for collecting video information relating to gaming activities as set forth in claim 8, wherein each of the plurality of video cameras comprises a digital video camera.

11. The apparatus for collecting video information relating to gaming activities as set forth in claim 8, wherein each of the plurality of video cameras comprises an analog video camera.

12. The apparatus for collecting video information relating to gaming activities as set forth in claim 11, and further comprising a video capture device operatively connected to the multiplexer and disposed beneath the gaming table.

13. The apparatus for collecting video information relating to gaming activities as set forth in claim 5, wherein the at least one video camera is positioned beneath the chip tray and behind a transparent barrier.

14. The apparatus for collecting video information relating to gaming activities as set forth in claim 13, wherein the transparent barrier comprises a planar surface that is oriented to eliminate a possibility of a player at the gaming table seeing an underside of a card in a reflection of the glass barrier.

15. The apparatus for collecting video information relating to gaming activities as set forth in claim 13, wherein the transparent barrier comprises a surface that is covered with a non-reflective film to eliminate a possibility of a player sitting at the gaming table seeing an underside of a card in a reflection of the glass barrier.

16. The apparatus for collecting video information relating to gaming activities as set forth in claim 13, wherein the transparent barrier comprises a surface that is made from a non-reflective material to eliminate a possibility of a player sitting at the gaming table seeing an underside of a card.

17. The apparatus for collecting video information relating to gaming activities as set forth in claim 14, wherein the at least one video camera positioned behind the transparent barrier comprises a plurality of video cameras positioned behind the transparent barrier.

18. The apparatus for collecting video information relating to gaming activities as set forth in claim 17, wherein the transparent barrier comprises tinted glass.

19. An apparatus for collecting video information relating to activities on a gaming table, the apparatus comprising:

a sensor disposed in proximity to the gaming table, the sensor being adapted to sense an occurrence of an event on a surface of the gaming table and to output a change-of-state signal;

at least one video camera disposed in proximity to the gaming table, the at least one video camera being configured and positioned to be activated to collect the video information relating to activities on the gaming table;

circuitry adapted to detect the change-of-state signal from the sensor, the circuitry further being adapted to activate the at least one video camera to automatically collect the video information upon the detection by the circuitry of the change-of-state signal from the sensor.

20. The apparatus for collecting video information relating to activities on a gaming table as set forth in claim 19, wherein the circuitry comprises a microprocessor 50.

21. The apparatus for collecting video information relating to activities on a gaming table as set forth in claim 19, wherein the at least one video camera comprises a plurality of video cameras.

22. The apparatus for collecting video information relating to activities on a gaming table as set forth in claim 19, wherein the event comprises a positioning of a hand of a user or customer over a predetermined location on the upper surface of the gaming table.

23. The apparatus for collecting video information relating to activities on a gaming table as set forth in claim 22, wherein the sensor comprises a density sensor.

24. The apparatus for collecting video information relating to activities on a gaming table as set forth in claim 22, wherein the sensor comprises a photocell.

25. The apparatus for collecting video information relating to activities on a gaming table as set forth in claim 22, wherein:
    the at least one video camera comprises a plurality of video cameras; and
    each one of the plurality of video cameras is focused on a different bet position on the upper surface of the gaming table.

26. The apparatus for collecting video information relating to activities on a gaming table as set forth in claim 25, wherein the predetermined location comprises a location to a right of a chip tray and in front of a discard rack.

27. The apparatus for collecting video information relating to activities on a gaming table as set forth in claim 21, wherein the event comprises a positioning of a hand of a user over an area to a right of a chip tray and in front of a discard rack.

28. The apparatus for collecting video information relating to activities on a gaming table as set forth in claim 19, wherein the event comprises an absence or presence of a card over a predetermined location on the upper surface of the gaming table.

29. The apparatus for collecting video information relating to activities on a gaming table as set forth in claim 28, wherein the sensor comprises a photocell.

30. The apparatus for collecting video information relating to activities on a gaming table as set forth in claim 28, wherein the sensor comprises of a stud sensor (capacity sensor).

31. The apparatus for collecting video information relating to activities on a gaming table as set forth in claim 28, wherein:
    the at least one video camera comprises a plurality of video cameras; and
    each one of the plurality of video cameras is focused on a different bet position on the upper surface of the gaming table.

32. The apparatus for collecting video information relating to activities on a gaming table as set forth in claim 31, wherein the predetermined location comprises a location directly in front of a chip tray.

33. The apparatus for collecting video information relating to activities on a gaming table as set forth in claim 21, wherein the event comprises a positioning of a card on the gaming table directly in front of a chip tray.

34. The apparatus for collecting video information relating to activities on a gaming table as set forth in claim 21, wherein:
    the sensor comprises a first sensor that is positioned to sense an occurrence of a first event on the surface of the gaming table and to output a first change-of-state signal;
    the apparatus for collecting video information relating to activities on a gaming table further comprises a second sensor positioned to sense an occurrence of a second event on the surface of the gaming table and to output a second change-of-state signal; and
    the circuitry is adapted to detect the first change-of-state signal from the first sensor and the second change-of-state signal from the second sensor, the circuitry further being adapted to activate the at least one video camera to automatically collect the video information upon the detection by the circuitry of both the first change-of-state signal from the first sensor and the second change of state signal from the second sensor.

35. The apparatus for collecting video information relating to activities on a gaming table as set forth in claim 34, wherein:
    the first event comprises a positioning of a hand of a user or customer over a first predetermined location on the upper surface of the gaming table; and
    the second event comprises an absence or presence of a card over a second predetermined location on the upper surface of the gaming table.

36. The apparatus for collecting video information relating to activities on a gaming table as set forth in claim 34, wherein:
    the circuitry is adapted to no longer activate the at least one video camera upon the detection by the circuitry of an absence or presence of the first change-of-state signal; and
    the circuitry is further adapted to cause video data from the at least one video camera to be placed into a digital storage medium, upon detection by the circuitry of an absence or presence of the second change-of-state signal.

37. The apparatus for collecting video information relating to activities on a gaming table as set forth in claim 36, wherein:
    the first event comprises a positioning of a hand of a user or customer over a first predetermined location on the upper surface of the gaming table; and
    the second event comprises an absence or presence of a card over a second predetermined location on the upper surface of the gaming table.

38. The apparatus for collecting video information relating to activities on a gaming table as set forth in claim 37, wherein the at least one video camera comprises a plurality of video cameras focused on different bet positions on the gaming table.

39. A video camera assembly for use on a gaming table, the video camera assembly comprising:
    a frame adapted to be coupled to a gaming table and to support a chip tray, wherein the frame comprises a length and a width which correspond in dimension to a length and a width of the chip tray; and
    a plurality of video cameras secured to the frame, each of the plurality of video cameras being adapted to be focused on an individual bet position on the gaming table.

40. The video camera assembly as set forth in claim 39, wherein:
    the frame has a rectangular shape;

the frame comprises two side walls, a back wall and a transparent front wall;

the plurality of video cameras are positioned to focus through the transparent front wall.

41. The video camera assembly as set forth in claim 40, wherein:

the transparent front wall comprises a plane of tinted glass; and the plane of tinted glass forms an angle of about 15 degrees with a line perpendicular to the upper surface of the gaming table;

wherein the transparent barrier comprises a planar surface that is oriented to eliminate a possibility of a player sitting at the gaming table seeing an underside of a card in a reflection of the glass barrier.

42. The video camera assembly as set forth in claim 40, wherein the frame is adapted to elevate the chip tray about 2 cm above the upper surface of the gaming table.

43. A method of collecting video information relating to activities on a gaming table, the method comprising the following steps:

providing at least one sensor in proximity to the gaming table, the sensor being adapted to sense the occurrence of an event on the surface of the gaming table and to output a change-of-state signal;

providing at least one video camera in proximity to the gaming table, the at least one video camera being configured and positioned to be activated to collect the video information relating to activities on the gaming table;

the at least one sensor outputting a change-of-state signal, in response to the sensor sensing the occurrence of an event on the surface of the gaming table;

detecting by a circuit the change-of-state signal from the at least one sensor; and the circuit activating the at least one video camera to automatically collect the video information, upon the detection by the circuit of the change-of-state signal from the at least one sensor.

44. The method of collecting video information relating to activities on a gaming table as set forth in claim 43, wherein:

(a) the step of providing at least one sensor comprises the following steps:

(1) providing a first sensor that is positioned to sense an occurrence of a first event on the surface of the gaming table and to output a first change-of-state signal; and (2) providing a second sensor that is positioned to sense an occurrence of a second event on the surface of the gaming table and to output a second change-of-state signal;

(b) the step of the at least one sensor outputting a change-of-state signal, in response to the sensor sensing the occurrence of an event on the surface of the gaming table, comprising the following steps:

(1) the first sensor outputting a first change-of-state signal, in response to the first sensor sensing the occurrence of the first event on the surface of the gaming table;

(2) the second sensor outputting a second change-of-state signal, in response to the second sensor sensing the occurrence of the second event on the surface of the gaming table;

(c) the step of detecting by a circuit the change-of-state signal from the at least one sensor comprises a step of detecting by the circuit at least one of the first change-of-state signal from the first sensor and the second change-of-state signal from the second sensor; and (d) the step of the circuit activating the at least one video camera to automatically collect the video information comprises a step of the circuit activating the at least one video camera to automatically collect the video information upon the detection by the circuit of at least one of the first change-of-state signal from the first sensor and the second change of state signal from the second sensor.

45. The method of collecting video information relating to activities on a gaming table as set forth in claim 44, wherein:

the step of detecting by the circuit at least one of the first change-of-state signal from the first sensor and the second change-of-state signal from the second sensor comprises a step of detecting by the circuit both the first change-of-state signal from the first sensor and the second change-of-state signal from the second sensor; and the step of the circuit activating the at least one video camera to automatically collect the video information upon the detection by the circuit of at least one of the first change-of-state signal from the first sensor and the second change of state signal from the second sensor comprises a step of the circuit activating the at least one video camera to automatically collect the video information upon the detection by the circuit both the first change-of-state signal from the first sensor and the second change of state signal from the second sensor.

46. The method of collecting video information relating to activities on a gaming table as set forth in claim 45, wherein the step of detecting by the circuit both the first change-of-state signal from the first sensor and the second change-of-state signal from the second sensor comprises a step of detecting by the circuit both the first change-of-state signal, corresponding to a hand of a user or customer being placed over a first predetermined location on the upper surface of the gaming table, and the second change-of-state signal, corresponding to a card or being present or absent over a second predetermined location on the upper surface of the gaming table.

47. The apparatus for collecting video information relating to activities on a gaming table as set forth in claim 45, wherein the step of the circuit activating the at least one video camera to automatically collect the video information, upon the detection by the circuit of the change-of-state signal from the at least one sensor, is followed by a step of the circuit ceasing to activate the at least one video camera upon the detection by the circuit of an absence of the first change-of-state signal.

48. The apparatus for collecting video information relating to activities on a gaming table as set forth in claim 47, wherein the step of the circuit ceasing to activate the at least one video camera upon the detection by the circuit of an absence or presence of the first change-of-state signal, is followed by a step of the circuit causing video data from the at least one video camera to be placed into a digital storage medium, upon detection by the circuitry of an absence or presence of the second change-of-state signal.

49. The apparatus for collecting video information relating to activities on a gaming table as set forth in claim 48, wherein the step of providing at least one video camera in proximity to the gaming table comprises a step of providing a plurality of video cameras in proximity to the gaming table; and the step of the circuit activating the at least one video camera to automatically collect the video information comprises a step of the circuit activating the plurality of video camera to automatically collect the video information.

50. The apparatus for collecting video information relating to activities on a gaming table as set forth in claim 49, wherein the step of providing a plurality of video cameras in proximity to the gaming table comprise a step of providing a plurality of video cameras in proximity to the gaming table with each one of the plurality of video cameras being focused on a different bet position on the gaming table.

51. The method of collecting video information relating to activities on a gaming table as set forth in claim 43, wherein the change-of-state signal comprises a closed signal that is output by the sensor upon detection by the sensor that an object has been placed over a predetermined point on a surface of the gaming table.

52. The method of collecting video information relating to activities on a gaming table as set forth in claim 43, wherein the change-of-state signal comprises a closed signal that is output by the sensor upon detection by the sensor that an object has been placed over a predetermined point on a surface of the gaming table.

53. The apparatus for collecting video information relating to gaming activities as set forth in claim 13, wherein the transparent barrier comprises a curved surface that is oriented to eliminate a possibility of a player at the gaming table seeing an underside of a card in a reflection of the glass barrier.

54. The apparatus for collecting video information relating to gaming activities as set forth in claim 19, wherein the sensor is connected to the gaming table.

55. The apparatus for collecting video information relating to gaming activities as set forth in claim 19, wherein the sensor is disposed in proximity to but does not contact the gaming table.

56. The apparatus for collecting video information relating to gaming activities as set forth in claim 19, wherein the sensor comprises a video camera.

57. The apparatus for collecting video information relating to activities on a gaming table as set forth in claim 25, wherein the predetermined location comprises a location to a left of a chip tray and in front of a discard rack.

58. The apparatus for collecting video information relating to activities on a gaming table as set forth in claim 19, wherein the sensor comprises an air pressure sensor constructed to react to a placement of or removal of a card or a hand of a user or customer over a predetermined location of the gaming table 10.

59. The apparatus for collecting video information relating to activities on a gaming table as set forth in claim 19, wherein the sensor comprises a radar device constructed to detect a placement of or removal of a card or a hand of a user or customer over a predetermined location of the gaming table 10.

60. The apparatus for collecting video information relating to activities on a gaming table as set forth in claim 19, wherein the sensor comprises an infrared sensor reacting to the absence or presence of body heat radiating from a user's hand.

61. The apparatus for collecting video information relating to activities on a gaming table as set forth in claim 19, wherein the sensor comprises an ultrasound transmitter and receiver reacting to the change of echo when a user's hand or a card is placed over the sensor.

62. The apparatus for collecting video information relating to activities on a gaming table as set forth in claim 19, wherein the sensor comprises a magnetic hall-effect sensor reacting to the absence or presence of a small magnet located on a user's arm cuff.

63. The apparatus for collecting video information relating to activities on a gaming table as set forth in claim 19, wherein the sensor comprises an inductive touch sensor reacting to the touch of a user's hand.

64. The apparatus for collecting video information relating to activities on a gaming table as set forth in claim 19, wherein the sensor comprises a photo transmitter and receiver reacting to a change in light intensity.

65. The apparatus for collecting video information relating to activities on a gaming table as set forth in claim 34, wherein:
the first event comprises an absence or presence of a card over a second predetermined location on the upper surface; and
the second event comprises a positioning of a hand of a user or customer over a first predetermined location on the upper surface of the gaming table of the gaming table.

66. The apparatus for collecting video information relating to activities on a gaming table as set forth in claim 36, wherein:
the first event comprises an absence or presence of a card over a second predetermined location on the upper surface; and
the second event comprises a positioning of a hand of a user or customer over a first predetermined location on the upper surface of the gaming table of the gaming table.

67. The video camera assembly as set forth in claim 39, wherein the frame is adapted to rest on an upper surface of a gaming table.

68. The video camera assembly as set forth in claim 39, wherein the frame is adapted to be mounted inside of a pre-existing hole, which was previously cut into a gaming table for accommodating a chip tray.

69. The apparatus for collecting video information relating to gaming activities as set forth in claim 4, wherein the at least one video camera is positioned on the upper surface of the gaming table next to a chip tray.

70. The apparatus for collecting video information relating to gaming activities as set forth in claim 69, wherein:
the chip tray comprises an inner side facing a center of the upper surface of the gaming table and an outer side facing away from the center of the upper surface of the gaming table; and
the at least one video camera is positioned on the upper surface of the gaming table by the inner side of the chip tray.

71. The apparatus for collecting video information relating to gaming activities as set forth in claim 70, wherein the at least one video camera is disposed within a housing on the upper surface of the gaming table by the inner side of the chip tray.

* * * * *